(12) United States Patent
Perez

(10) Patent No.: US 6,216,721 B1
(45) Date of Patent: Apr. 17, 2001

(54) AXIAL CONTROL VALVE

(75) Inventor: Reuben Perez, Kibbutz Evron (IL)

(73) Assignee: Bermad, Kibbutz Evron (IL)

( * ) Notice: Subject to any disclaimer, the term of this patent is extended or adjusted under 35 U.S.C. 154(b) by 0 days.

(21) Appl. No.: 09/492,864

(22) Filed: Jan. 27, 2000

(30) Foreign Application Priority Data

Jan. 26, 1999 (IL) .................................................. 128242

(51) Int. Cl.[7] .............................. F16K 1/12; F16K 31/122
(52) U.S. Cl. .......................................... 137/219; 251/63
(58) Field of Search .................................. 137/219; 251/63

(56) References Cited

U.S. PATENT DOCUMENTS 3,617,151 * 11/1971 Scroggins ..................... 137/219 X
5,069,246 * 12/1991 Booyens ............................ 137/219

* cited by examiner

Primary Examiner—Gerald A. Michalsky
(74) Attorney, Agent, or Firm—Nixon & Vanderhye P.C.

(57) ABSTRACT

A control valve (10) including a housing (16), a pair of end caps (12, 14) sealingly attached to the housing (16), each the end cap (12, 14) being formed with a bore (20) for flow of a fluid therethrough, a shaft (26) fixedly attached to the end caps (12, 14) and which passes through the housing (16), a piston housing (40) disposed in the housing (16) and secured between the end caps (12, 14), the piston housing (40) being formed with a plurality of circumferentially spaced apertures (42) for flow of a fluid therethrough, a valve seat (48) sealingly secured to one of the end caps (12), and a piston (60) sealingly disposed in the piston housing (40), arranged to slide along the shaft (26) and selectively sealingly abut against the valve seat (48), wherein when the piston (60) does not sealingly abut against the valve seat (48), a fluid can flow through the bore (20) of one of the end caps (12), past the apertures (42) of the piston housing (40), between the piston housing (40) and the housing (16) and out through the bore (20) of the other end cap (14).

11 Claims, 2 Drawing Sheets

AXIAL CONTROL VALVE

FIELD OF THE INVENTION

The present invention relates generally to pressure-operated control valves and particularly to a pressure operated control valve with a simplified axial construction.

BACKGROUND OF THE INVENTION

A large number of pressure-operated control valves have been developed. In these types of valves, a pressurized fluid (water, air or other liquid or gas) selectively closes or opens a seal in the valve to regulate the flow of liquids or gases through the valve. Two examples of valves which belong to this large family include diaphragm valves (in which a pressurized fluid selectively forces a diaphragm against a valve seat to shut off the flow of a liquid) and globe valves (which have a somewhat globe-shaped housing including a control chamber in which a fluid pressure controls passage of a liquid through the control chamber).

A problem which challenges design of prior art pressure-operated control valves is attaining good flow characteristics, i.e., minimizing pressure drop and turbulence through the valve.

SUMMARY OF THE INVENTION

The present invention seeks to provide an improved pressure-operated control valve with a simplified construction which has significant advantages over prior art control valves. The valve of the present invention is distinguished by its simplistic construction which achieves a low pressure drop through the valve, reduces turbulence of fluid flow therethrough, and greatly reduces manufacturing costs.

The valve of the present invention has a modular construction in which all parts are mechanically linked together by a single shaft bolt. This bolt acts a guide for a cone-tipped piston which is selectively urged by fluid pressure against a valve seat to shut off flow of a liquid or gas through the valve. The piston is the only moving part in the valve. The cone-shaped tip of the piston helps streamline flow through the valve and thereby reduce pressure drop therethrough. In addition, there are several circumferential apertures within the valve housing through which the liquid or gas flows. These apertures help ensure uniform and stable flow.

The valve has inlet and outlet ports which are identical in shape, thereby reducing manufacturing and inventory costs.

It is a particular feature of the present invention that the piston tip does not have an O-ring but rather seats against an O-ring secured to the valve seat. This construction educes manufacturing costs and prolongs the service life of the piston-valve seat seal.

There is thus provided in accordance with a preferred embodiment of the present invention a control valve including a housing, a pair of end caps sealingly attached to the housing, each end cap being formed with a bore for flow of a fluid therethrough, a shaft fixedly attached to the end caps and which passes through the housing, a piston housing disposed in the housing and secured between the end caps, the piston housing being formed with a plurality of circumferentially spaced apertures for flow of a fluid therethrough, a valve seat sealingly secured to one of the end caps, and a piston sealingly disposed in the piston housing, arranged to slide along the shaft and selectively sealingly abut against the valve seat, wherein when the piston does not sealingly abut against the valve seat, a fluid can flow through the bore of one of the end caps, past the apertures of the piston housing, between the piston housing and the housing and out through the bore of the other end cap.

In accordance with a preferred embodiment of the present invention the valve seat includes a seal attached thereto and the piston selectively sealingly abuts against the seal.

Further in accordance with a preferred embodiment of the present invention the piston includes a generally cone-shaped tip which selectively sealingly abuts against the valve seat.

Still further in accordance with a preferred embodiment of the present invention the piston is formed with an outlet-end facing bore in which is disposed a biasing device which tends to urge the piston towards an inlet end of the valve.

Additionally in accordance with a preferred embodiment of the present invention a fluid fitting is attached to and fluidly communicating with the piston housing at an aperture formed in the piston housing near an outlet end of the piston.

In accordance with a preferred embodiment of the present invention one of the end caps is formed with an inlet port and the other of the end caps is formed with an outlet port, the ports fluidly communicating with the bore formed in the corresponding end cap, and wherein the ports are in fluid communication with the fluid fitting and wherein the ports and the fluid fitting are connected by means of a fluid device. The fluid device may be manually or automatically controlled.

Further in accordance with a preferred embodiment of the present invention each end cap is formed with a central bore and a hub which is supported by a plurality of ribs which extend from an inner perimeter of the bore, and the shaft is fixedly attached to the hubs.

Still further in accordance with a preferred embodiment of the present invention the end caps are identical in construction.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
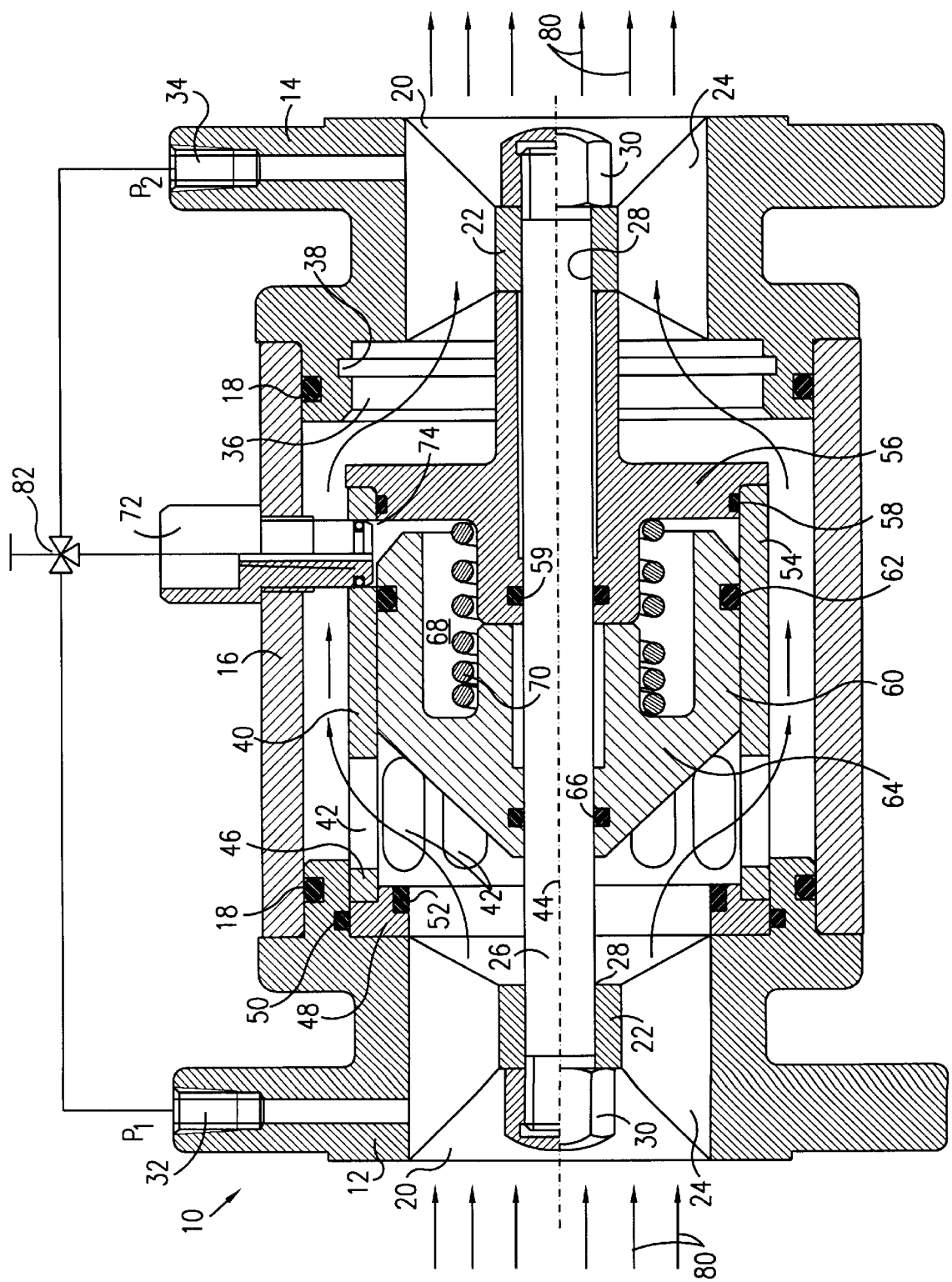
FIGS. 1 and 2 are simplified sectional illustrations of a control valve constructed and operative in accordance with a preferred embodiment of the present invention, respectively in open and closed positions.

Reference is now made to FIG. 1 which illustrates control valve 10 constructed and operative in accordance with a preferred embodiment of the present invention.

Control valve 10 preferably includes a pair of end caps 12 and 14 which are sealingly attached to a cylindrical housing 16 by means of O-rings 18. End caps 12 and 14 are preferably identical in construction. Each end cap preferably is formed with a central bore 20 and a hub 22 which is supported by a plurality of ribs 24 which extend from an inner perimeter of bore 20. Hub 22 may be supported by any number of ribs and the ribs may have any kind of shape. End caps 12 and 14 are preferably fastened to housing 16 by means of a central shaft 26 which passes through a hole 28 formed in each hub 22 and nuts 30 which threadingly clamp on to threaded ends of shaft 26.

End caps 12 and 14 are preferably formed with an inlet port 32 and an outlet port 34, respectively, which fluidly communicate with bore 20. In addition, each end cap 12 and 14 preferably has a counterbore 36 extending inwards from bore 20 and a circumferential groove 38 is formed on counterbore 36. End caps 12 and 14 are preferably connectable to fluid piping (not shown).

A cylindrical piston housing 40 is preferably centrally located in cylindrical housing 16 and is formed with a plurality of apertures 42 spaced circumferentially about a longitudinal axis 44 of piston housing 40. An inlet end 46 of piston housing 40 preferably abuts against a valve seat 48 which is sealingly secured to end cap 12 preferably by means of an O-ring 50 placed in groove 38 of end cap 12. A seal 52 is preferably affixed to valve seat 48, such as by means of thermal bonding thereto. Seal 52 may be made of any suitable elastomeric or polymeric material, such as nitrile-butadiene rubber (NBR) or polytetrafluoroethylene (PTFE), for example. An outlet end 54 of piston housing 40 preferably abuts against a cylindrical spacer element 56 by means of an C-ring 58. Spacer element 56 is sandwiched between piston housing 40 and the hub 22 of end cap 14. Spacer element 56 is preferably sealed with respect to shaft 26 by means of an O-ring 59. It is appreciated that alternatively piston housing 40 and spacer element 56 may be integrally formed together as one unitary piston housing.

A piston 60 is preferably slidingly disposed in piston housing 40 and is sealed therewith by means of an O-ring 62. Piston 60 preferably has a cone-shaped tip 64 which is sealed with respect to shaft 26 by means of an O-ring 66. Piston 60 is preferably formed with an outlet-end facing bore 68 in which is disposed a biasing device such as a spring 70. The tension of spring 70 tends to urge piston 60 towards the inlet end of valve 10, i.e., towards end cap 12. A fluid fitting 72 is attached to and fluidly communicates with piston housing 40 at an aperture 74 formed in piston housing 40 near the outlet end of piston 60. Inlet port 32, outlet port 34 and fluid fitting 72 are preferably connected to each other by means of a fluid device 82. Fluid device 82, which may be either manual or automatic, may be a three-way valve or solenoid, for example.

The operation of valve 10 is now described. End caps 12 and 14 are connected to fluid piping (not shown) through which flows a fluid 80. The pressure of fluid 80 entering bore 20 pushes against cone-shaped tip 64 of piston 60 and forces piston 60 away from valve seat 48. The pressure of fluid 80 thus compresses spring 70 to the position shown in FIG. 1. In this position, fluid 80 is free to flow past apertures 42 of piston housing 40, between the outer perimeter of piston housing 40 and the inner perimeter of housing 16 and out bore 20 of end cap 14.

The flow of fluid 80 through valve 10 can be regulated by opening fluid device 82 so as to introduce some of the fluid 80 into fluid fitting 72. Fluid 80 then flows through aperture 74 into bore 68, i.e., into the space between the outlet end of piston 60 and spacer element 56. The magnitude of the flow and/or pressure against the outlet end of piston 60 can thus be regulated by means of fluid device 82, such that piston 60 is distanced from valve seat 48 by any required amount, thereby regulating the flow of fluid 80 through valve 10. In general, while fluid 80 is flowing through valve 10, fluid device 82 is set such that fluid 80 can flow through inlet port 32 (at a pressure $P_1$) past fluid device 82 into fluid fitting 72.

Figure 2:
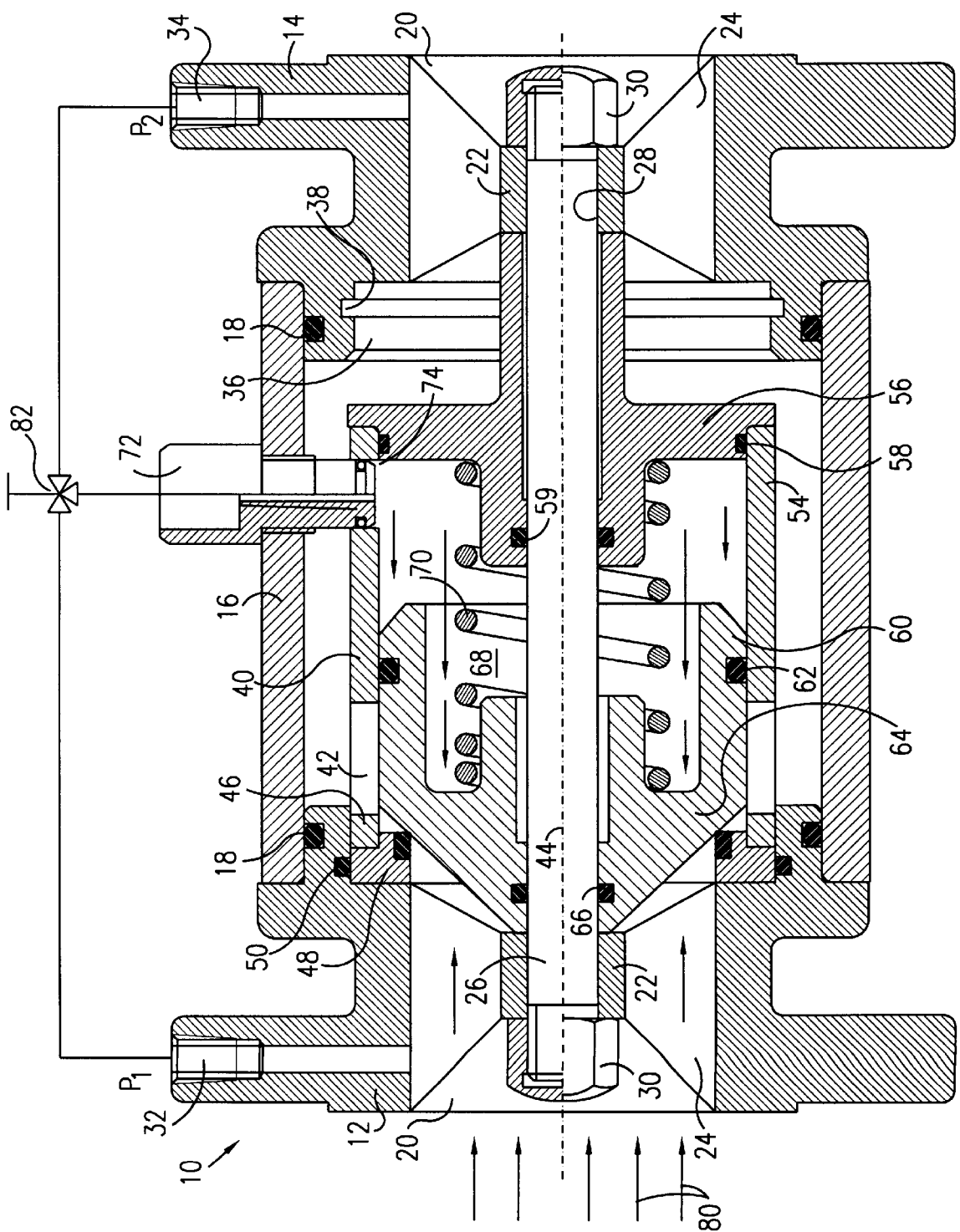

As seen in FIG. 2, the fluid pressure introduced through aperture 74 can be increased so as to sealingly urge piston 60 against valve seat 48 and shut off flow of fluid 80 through valve 10. Spring 70 helps in urging piston 60 to the closed position as well. In order to reopen valve 10, the fluid pressure in the space between the outlet end of piston 60 and spacer element 56 is released by means of fluid device 82 bleeding off the fluid 80 which was trapped behind the outlet end of piston 60. In such a case, fluid device 82 is set such that fluid 80 can flow through fluid fitting 72 past fluid device 82 and then through outlet port 34 (at a pressure $P_2$, $P_1$ being greater than $P_2$).

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A control valve (10) comprising:

a housing (16);

a pair of end caps (12, 14) sealingly attached to said housing (16), each said end cap (12, 14) being formed with a bore (20) for flow of a fluid therethrough;

a shaft (26) fixedly attached to said end caps (12, 14) and which passes through said housing (16);

a piston housing (40) disposed in said housing (16) and secured between said end caps (12, 14), said piston housing (40) being formed with a plurality of circumferentially spaced apertures (42) for flow of a fluid therethrough;

a valve seat (48) sealingly secured to one of said end caps (12); and a piston (60) sealingly disposed in said piston housing (40), arranged to slide along said shaft (26) and selectively sealingly abut against said valve seat (48), wherein when said piston (60) does not sealingly abut against said valve seat (48), a fluid can flow through the bore (20) of one of said end caps (12), past said apertures (42) of said piston housing (40), between said piston housing (40) and said housing (16) and out through the bore (20) of the other end cap (14).

2. The control valve (10) according to claim 1 wherein said valve seat (48) comprises a seal (52) attached thereto and said piston (60) selectively sealingly abuts against said seal (52).

3. The control valve (10) according to claim 1 wherein said piston (60) comprises a generally cone-shaped tip (64) which selectively sealingly abuts against said valve seat (48).

4. The control valve (10) according to claim 1 wherein said piston (60) is formed with an outlet-end facing bore (68) in which is disposed a biasing device (70) which tends to urge said piston (60) towards an inlet end of said valve (10).

5. The control valve (10) according to claim 1 further comprising a fluid fitting (72) attached to and fluidly communicating with said piston housing (40) at an aperture (74) formed in said piston housing (40) near an outlet end of said piston (60).

6. The control valve (10) according to claim 5 wherein one of said end caps (12) is formed with an inlet port (32) and the other of said end caps (14) is formed with an outlet port (34), the ports (32, 34) fluidly communicating with the bore (20) formed in the corresponding end cap (12, 14), and wherein said ports (32, 34) are in fluid communication with said fluid fitting (72) and wherein said ports (32, 34) and said fluid fitting (72) are connected to each other by means of a fluid device (82).

7. The control valve (10) according to claim 6 wherein said fluid device (82) is manually controlled.

8. The control valve (10) according to claim 6 wherein said fluid device (82) is automatically controlled.

9. The control valve (10) according to claim 1 wherein one of said end caps (12) is formed with an inlet port (32) and the other of said end caps (14) is formed with an outlet port (34), the ports (32, 34) fluidly communicating with the bore (20) formed in the corresponding end cap (12, 14).

10. The control valve (10) according to claim 1 wherein each said end cap (12, 14) is formed with a central bore (20) and a hub (22) which is supported by a plurality of ribs (24) which extend from an inner perimeter of said bore (20), and said shaft (26) is fixedly attached to said hubs (22).

11. The control valve (10) according to claim 1 wherein said end caps (12, 14) are identical in construction.

* * * * *